C. A. CHRISTIANSEN.
STORAGE BATTERY VENT.
APPLICATION FILED MAY 3, 1916.

1,283,670.

Patented Nov. 5, 1918.

INVENTOR.
CHRISTIAN A. CHRISTIANSEN
BY Ira J. Adams.
ATTORNEY

UNITED STATES PATENT OFFICE.

CHRISTIAN A. CHRISTIANSEN, OF CLEVELAND, OHIO, ASSIGNOR, BY MESNE ASSIGNMENTS, TO NATIONAL CARBON COMPANY, INC., A CORPORATION OF NEW YORK.

STORAGE-BATTERY VENT.

1,283,670.　　　　　Specification of Letters Patent.　　Patented Nov. 5, 1918.

Application filed May 3, 1916. Serial No. 95,092.

*To all whom it may concern:*

Be it known that I, CHRISTIAN A. CHRISTIANSEN, a citizen of the United States, residing at Cleveland, in the county of Cuyahoga and State of Ohio, have invented a certain new and useful Improvement in Storage-Battery Vents, of which the following is a full, clear, and exact description.

This invention relates to electric batteries and more particularly to air vents for storage batteries.

Gases are generated during the charging of a storage battery and it is necessary to have an opening or vent to the outside to permit such gases to escape. Otherwise sufficient pressure would be created to burst the jar.

It is the object of my invention to procure a battery vent that is very readily inserted in place in the cover and which will permit the use of maximum amount of electrolyte in the jar without trapping the gases.

Referring to the drawings.

Figure 1:
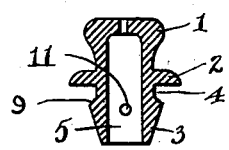
Figure 1 is a sectional view of my improved battery vent.
Figure 2:
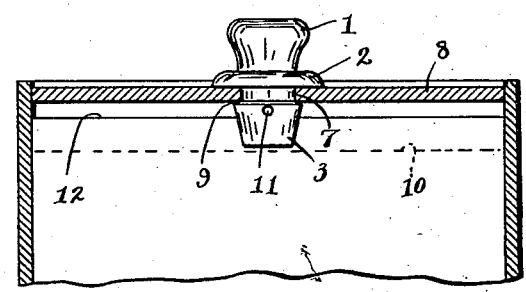
Fig. 2 is a sectional view of the upper portion of a battery jar showing the vent in operative position.

Referring to the drawings, the vent is made of some elastic material such as soft rubber, and consists of a knot 1 having an upper flange 2 and a conically shaped portion 3 on the lower end. The dimensions of the flange 2 and conical portion 3 are such that an annular groove 4 is provided between the two, which is intended to receive the cover of the jar when the vent is placed in position.

The rubber vent has a hollow chamber 5 extending from the end of the cone 3 to the upper part of the knob 1. A small hole 6 pierces the knob and permits communication of the chamber 5 with the exterior.

When it is desired to place the vent in position, all that is necessary is to grasp it by the knob 1 and push it down into the hole 7 of the cover 8, the elasticity of cone 3 permitting this. When this is done the small flange 9 on the lower conical portion of the vent coöperates with the upper flange 2 to hold the vent in position in the cover. If the vent were made in this way the conical portion 3 would project so far through the cover that a large empty space would be left in the top of the jar, as it would be necessary for the liquid level 10 to be beneath the end of the cone so that the gases would not be trapped. In order to overcome this objection, I therefore place one or more holes 11 in the rubber vent in such a place that they will come immediately beneath the cover 8 when the vent is placed in position. This enables one to fill the jar to the level 12 and still provide for the escape of gases to the outside through holes 11 and 6.

My improvement facilitates easy insertion of the vent into the jar cover and the transverse holes at the base of the cone permit almost complete filling of the jar with electrolyte. The available electrolyte space in a portable storage battery is, at best, barely sufficient, and therefore this increase in the electrolyte space, without an increase in the size of the battery, is a decided advantage.

Having described my invention, what I claim is:

1. In electric batteries, a vent consisting of a hollow elastic body portion having an exterior flange, a tapered hollow portion on the lower part of the body portion whereby it may be inserted readily in the cover, and one or more transverse vent holes in said second portion closely adjacent to its point of junction with said body portion.

2. In electric batteries, a vent consisting of a hollow elastic body having two exterior flanges spaced apart to form a slightly annular groove, said body tapering from the lower flange to the lower end, and one or more vent holes extending transversely through the body adjacent said lower flange.

In testimony whereof, I hereunto affix my signature.

C. A. CHRISTIANSEN.

Copies of this patent may be obtained for five cents each, by addressing the "Commissioner of Patents, Washington, D. C."